(12) United States Patent
Catoen (10) Patent No.: US 8,449,287 B2
(45) Date of Patent: May 28, 2013

(54) VALVE PIN FOR ACCOMMODATING SIDE LOADING

(75) Inventor: Bruce Catoen, Georgetown (CA)

(73) Assignee: Mold-Masters (2007) Limited, Georgetown, ON (CA)

(*) Notice: Subject to any disclaimer, the term of this patent is extended or adjusted under 35 U.S.C. 154(b) by 84 days.

(21) Appl. No.: 13/228,536

(22) Filed: Sep. 9, 2011

(65) Prior Publication Data

US 2012/0231111 A1    Sep. 13, 2012

Related U.S. Application Data (60) Provisional application No. 61/381,702, filed on Sep. 10, 2010.

(51) Int. Cl.
*B29C 45/23* (2006.01)

(52) U.S. Cl.
USPC .................. 425/564; 264/328.9; 425/566

(58) Field of Classification Search
USPC .................. 425/564, 565, 566; 264/328.9
See application file for complete search history.

(56) References Cited

U.S. PATENT DOCUMENTS

| | | | |
|---|---|---|---|
| 3,023,458 A | 5/1954 | Seymour | |
| 3,849,048 A | 11/1974 | Bielfeldt et al. | |
| 3,952,927 A | 4/1976 | Schaumburg et al. | |
| 4,663,811 A | 5/1987 | Gellert | |
| 4,810,184 A * | 3/1989 | Gellert et al. | 425/564 |
| 5,387,099 A * | 2/1995 | Gellert | 425/564 |
| 6,129,541 A | 10/2000 | Takeda | |
| 6,379,144 B1 | 4/2002 | Wright | |
| 6,419,870 B1 * | 7/2002 | Lee et al. | 425/564 |
| 6,599,116 B2 * | 7/2003 | Lee et al. | 425/564 |
| 7,037,103 B2 | 5/2006 | Niewels | |
| 7,766,647 B2 | 8/2010 | Dewar et al. | |
| 2006/0153945 A1 | 7/2006 | Blais et al. | |
| 2010/0209547 A1 | 8/2010 | Heissler et al. | |

FOREIGN PATENT DOCUMENTS

| | | |
|---|---|---|
| CN | 101314253 A | 12/2008 |
| JP | 6-3619 U | 1/1994 |
| JP | 9-262880 A | 10/1997 |
| JP | 10-296798 A | 11/1998 |
| JP | 11-156895 A | 6/1999 |
| JP | 2002-283412 A | 10/2002 |
| JP | 2004-209955 A | 7/2004 |
| KR | 10-2008-0079967 A | 9/2008 |
| KR | 10-2011-0078432 A | 7/2011 |
| WO | 2008/014910 A | 2/2008 |

* cited by examiner

*Primary Examiner* — Tim Heitbrink
(74) *Attorney, Agent, or Firm* — Medler Ferro PLLC

(57) ABSTRACT

A valve pin that accommodates side loading for use in a valve-gated nozzle of a hot runner injection molding system is disclosed. The valve pin is operably coupled at a rearward end to an actuating mechanism and includes a shaft that extends through the system such that a forward end thereof engages with a mold gate of a mold cavity. The valve pin shaft has a region forward of the rearward end thereof that accommodates side loading under operating conditions. The region may be a slidable or rotatable interface configured to provide lateral or angular movement between upstream and downstream portions of the valve pin shaft under side loading conditions or may be configured to provide increased flexibility to the valve pin shaft within the region to permit deflection of the valve pin under side loading conditions.

15 Claims, 11 Drawing Sheets

VALVE PIN FOR ACCOMMODATING SIDE LOADING

CROSS REFERENCE TO RELATED APPLICATIONS

This application claims benefit under 35 U.S.C. §119(e) of U.S. Provisional Application No. 61/381,702, filed Sep. 10, 2010, which is incorporated by reference herein in its entirety.

FIELD OF THE INVENTION

The present invention relates to plastic injection molding, and in particular to a valve pin capable of accommodating side loading

BACKGROUND OF THE INVENTION

Injection molding systems generally include an injection molding unit and a hot runner system, wherein the hot runner system has one or more manifolds and one or more nozzles in fluid communication therewith. More particularly, the hot runner manifolds receive a melt stream of moldable material from the injection molding unit and transfer the melt stream to one or more mold cavities via a respective hot runner nozzle. Generally, hot runner systems offer the choice between nozzles that are thermal gated or valve gated. Valve-gated nozzles are generally used in molding applications where the esthetic appearance of the molded part is important, because such nozzles usually provide a better gate vestige on the molded part over thermal gated nozzles.

Each valve-gated nozzle has a valve pin extending from a valve pin actuator or a valve pin may be coupled to an actuatable valve plate. In either case, the valve pin passes through the manifold and extends into and through a melt channel of the nozzle to have a downstream end seatable within a mold gate of a mold cavity. Control of the melt stream is achieved by raising and lowering the valve pin. More particularly, retracting the valve pin from the mold gate permits the melt stream to flow into the mold cavity while re-seating the downstream end of the valve pin within the mold gate prevents further flow of the melt stream into the mold cavity. The movement of the valve pin is controlled by the valve pin actuator, which may be, for example, a pneumatic or hydraulic system that raises and lowers the valve pin.

The intermittent flow of the melt stream through the manifold and nozzles, the cooling of the mold to effect removal of the molded parts and the subsequent re-heating and control of the temperature for injection of moldable material, results in temperature changes in the valve pins, the nozzles, and the manifold. The required temperatures and control of such temperatures are achieved using heaters in the manifold and/or nozzles.

The heating, cooling and temperature control of the manifold, nozzles, and mold plates of the injection molding system, including during start up and shut down of the injection molding system, results in some thermal expansion and contraction of the hot runner components. Relative changes in position of the manifold and nozzle assemblies caused by the thermal expansion and contraction apply stress to the valve pins, which pass through the manifold and extend into the nozzles, with the consequence that the valve pins tend to be forced away from alignment with the mold gates, i.e., are deflected. This can lead to bending and damage of the valve pins which in turn can result in damage to the mold gates. Uncontrolled bending of the valve pins and damage to the mold gates can lead to loss of control of flow of the melt stream through the mold gates, for e.g., by poor seating of the downstream ends of the valve pins in the mold gates and/or changes in timing of closing of the mold gates. This in turn may lead to processing problems, such as melt drool at one or more of the mold gates or inconsistent injection of the melt stream into the mold cavities.

Some prior solutions to accommodate thermal changes in an injection molding system include bolting or otherwise securing the valve-gated nozzle assemblies and manifold together, so that there is no relative movement in the positions of the valve pin actuators, manifold and nozzles with a change in temperature. However, this can lead to stress on the valve pin actuators due to the high temperature of the manifold as well as in other parts of the injection molding system and may create increased heat loss. Alternatively, the manifold may be allowed to float in position with respect to both the valve pin actuators and the valve-gated nozzles. In other words, the manifold is not bolted to the valve pin actuators or the mold plate within which they are seated or to the valve-gated nozzles, in which case there is a tendency for the valve pins to be deflected from alignment and become distorted or bent as the manifold undergoes thermal expansion and/or contraction.

It is therefore an object of the present invention to provide a novel solution for accommodating thermal expansion and contraction in an injection molding system that utilizes valve-gated nozzles that also addresses one or more of the deficiencies noted above.

SUMMARY OF THE INVENTION

Embodiments hereof are directed to a valve pin for use in a valve-gated nozzle of a hot runner injection molding system that accommodates side loading. The valve pin is operably coupled at a rearward end to an actuating mechanism and includes a shaft that extends through the system such that a forward end thereof engages with a mold gate of a mold cavity. The valve pin shaft has a region just forward of the rearward end thereof that accommodates side loading under operating conditions. In some embodiment, the region may be a slidable or rotatable interface configured to provide lateral or angular movement between upstream and downstream portions of the valve pin shaft. In other embodiments, the region may provide increased flexibility and be formed by decreasing a diameter of the valve pin shaft within the region to permit deflection of the valve pin under side loading conditions.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

DETAILED DESCRIPTION OF EXEMPLARY EMBODIMENTS

Specific embodiments of the present invention are now described with reference to the figures. The following detailed description is merely exemplary in nature and is not intended to limit the invention or the application and uses of the invention. Although the description of the embodiments hereof is in the context of hot runner injection molding systems, the invention may also be used in other molding arrangements where it is deemed useful. Furthermore, there is no intention to be bound by any expressed or implied theory presented in the preceding technical field, brief summary or the following detailed description.

Embodiments hereof relate to, among other things valve pins and components which can be used in an injection molding apparatus. The features and aspects described for the other embodiments can be used accordingly with the present embodiment. In the following description, "downstream" is used with reference to the direction of mold material flow from an inlet of the injection molding system to a mold cavity, whereas "upstream" is used with reference to the opposite direction. Similarly, "forward" is used with reference to a direction towards a parting line of a mold, whereas "rearward" is used with reference to a direction away from the parting line.

Figure 1:
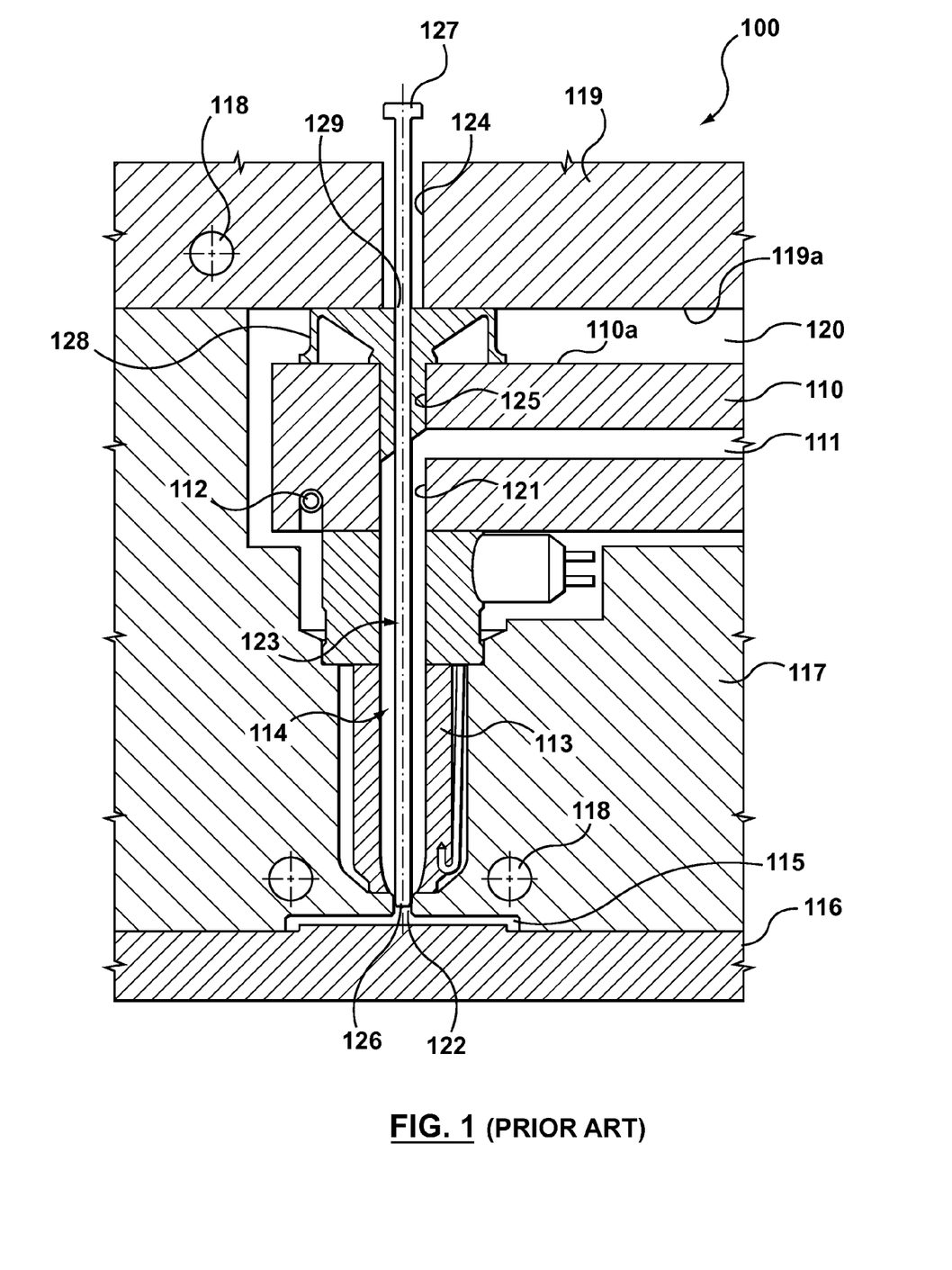
FIG. 1 is a sectional view of a portion of a prior art injection molding system showing a standard valve pin arrangement.

FIG. 1 shows a portion of a prior art valve-gated injection molding apparatus 100 which includes a hot runner manifold 110 through which a manifold melt channel 111 extends for flow of a pressurized melt stream of moldable material. Manifold 110 is heated by a heater 112. Apparatus 100 includes a valve-gated nozzle 113 to convey the pressurized melt stream through a central nozzle bore, or nozzle melt channel 114, from manifold melt channel 111 to a mold cavity 115, which is defined between a mold core plate 116 and a mold cavity plate 117. Nozzle 113 includes a heater (not shown) for maintaining the melt stream at a processing temperature and along with manifold 110 may be referred to as a hot runner system. Nozzle 113 is located in a nozzle well in mold cavity plate 117 through which cooling conduits 118 are provided for a cooling fluid such as water. Manifold 110 is located between a back plate 119 and mold cavity plate 117, with an insulative air space 120 provided there between. As would be understood by one of ordinary skill in the art, a manifold locater (not shown) is disposed between manifold 110 and mold cavity plate 117 opposite a sprue inlet (not shown) to maintain air space 120 there between and to properly position manifold 110 within apparatus 100. Cooling conduits 118 are also provided through back plate 119. Although only one nozzle 113 and manifold melt channel 111 is shown in FIG. 1, apparatus 100 will typically include a number of such nozzles and melt channels. As can be seen in FIG. 1, a downstream end of a manifold bore 125 forms a segment 121 of manifold melt channel 111, and more particularly, defines an outlet that is substantially transverse to the rest of manifold melt channel 111.

Nozzle melt channel 114 communicates with mold cavity 115 through a mold gate 122. An elongated valve pin 123 extends through axially aligned bores 124 and 125 in back plate 119 and manifold 110, respectively, as well as through nozzle melt channel 114. As known to one of ordinary skill in the art, valve pin 123 axially reciprocates to seat and unseat a tapered forward end 126 within mold gate 122 for controlling the flow of the melt stream into mold cavity 115. A pneumatic or other type of actuator (not shown) acts on a head 127 of valve pin 123 for axially reciprocating the valve pin forward and rearward between open and closed positions relative to mold gate 122.

A valve pin bushing 128 is located between back plate surface 119a and manifold surface 110a to maintain air space 120 there between. Valve pin bushing 128 has a central bore 129 that is axially aligned with back plate bore 124, manifold bore 125 and nozzle melt channel 114, through which valve pin 123 extends. Valve pin bushing 128 functions as a retaining and sealing bushing for helping to retain valve pin 123 in central alignment with mold gate 122 and to prevent, or reduce the amount of, melt stream material leaking from manifold bore 125. Valve pin bushing 128 also maintains a bearing pressure on manifold 110 to retain its location, and to ensure a fluid seal between manifold and nozzle melt channels 111, 114.

In a hot runner system, and particularly with respect to hot runner manifold 110, dimensional variances can occur. Such variances can arise due to a range of issues, such as, but not limited to heat expansion, damage to alignment components or the use of more generous machining tolerances. More particularly under operating conditions due to thermal expansion of manifold 110, manifold 110 will tend to shift or move outward from its manifold locater such that valve pin bushing 128, which moves with manifold 110, will shift at the interface with back plate 119, i.e., slide along back plate surface 119a, causing side loading and lateral stress on valve pin 123 that has head 127 thereof held by an actuator mechanism (not shown) within or above back plate 119. For example, in large hot runner systems, heat expansion of manifold 110 relative to the manifold locater positioned within mold cavity plate 117 can cause movement of manifold 110 relative to back plate 119 of up to, and occasionally greater than 1 mm, shifting valve pin bushing 128 out of alignment relative to the actuation mechanism and/or nozzle assembly, which in turn may cause damage to valve pin 123 which extends from back plate 119 through valve pin bushing 128 and manifold 110. In this arrangement, manifold 110 is said to "float" due to the shifting movement allowed relative to other system components during thermal expansion.

In some molding applications, it may be desirable to operate a given molding system, in particular the manifold at different temperatures, regardless of the thermal expansion variation. While hot runner systems are usually designed with clearances to accommodate dimensional variances, such designs are not always possible or capable of accommodating the extent of misalignment that may arise in a system that needs to be operated at higher temperatures. When the misalignment exceeds the allocated clearance, elongated valve pin 123 can be subjected to side loading and excessive bending forces due to mechanical interference particularly in the rearward segment of the valve pin that extends above the interface between valve pin actuator 128/manifold 110 and back plate 119. In such instances, in addition to excessive wear on elongated valve pin 123, the actuation mechanism (not shown) is placed under considerable load, decreasing system efficiency, and increasing the likelihood of pin seizure and/or actuator malfunction.

In accordance with embodiments hereof, a valve pin is provided with a region of increased flexibility to accommodate for valve pin misalignment by offsetting the effects of side loading and lateral displacement forces.

Figure 2A:
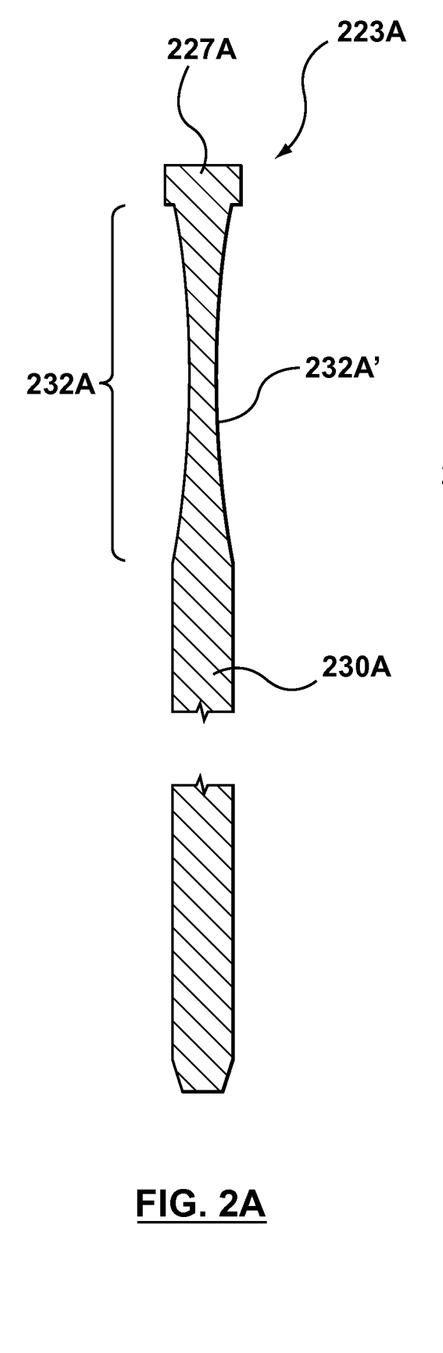
FIGS. 2A through 2D are sectional views showing various embodiments of a flexible valve pin having a region of increased flexibility provided by a segment of the valve pin having a reduced diameter.

A flexible valve pin 223A according to a first embodiment is shown in FIG. 2A in which pin shaft 230A is configured with a region of increased flexibility 232A. As shown, the region of increased flexibility 232A is provided by a reduction in diameter of pin shaft 230A having a scalloped or tapered profile 232A'. Region of increased flexibility 232A of valve pin 223A is a rearward segment of valve pin shaft 230A formed immediately forward of head 227A to be disposed rearward of a hot runner manifold within a bore of a cooled mold plate, such as rearward of manifold 110 and valve pin bushing 128 of apparatus 100 within back plate 119. The location of region 232A of valve pin 223A is desirably situated rearward of valve pin bushing 128 in an area where valve pins in prior art systems, such as valve pin 123 of apparatus 100 shown in FIG. 1, customarily jam or seize.

In an embodiment, a diameter of valve pin 223A may be reduced in the region of increased flexibility 232A by between 20 to 40% compared to the un-scalloped downstream segment of pin shaft 230A with region 232A being of a length of between 20 to 25 mm. For example, a valve pin having a pin shaft diameter of 5 mm, the diameter within scalloped profile 232A' may be 3.5 mm, representing a 30% reduction in diameter. Under conditions of excessive side loading on valve pin 223A, the region of increased flexibility 232A serves to accommodate any lateral displacement forces by allowing increased flexibility in valve pin 223A.

Figure 2B:
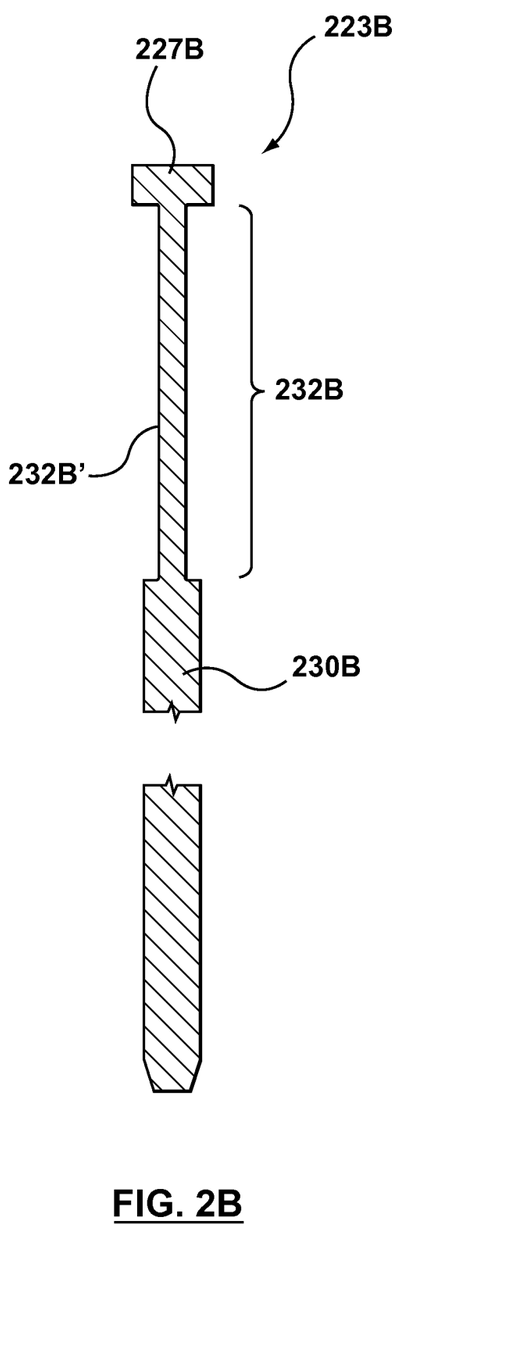
Figure 2C:
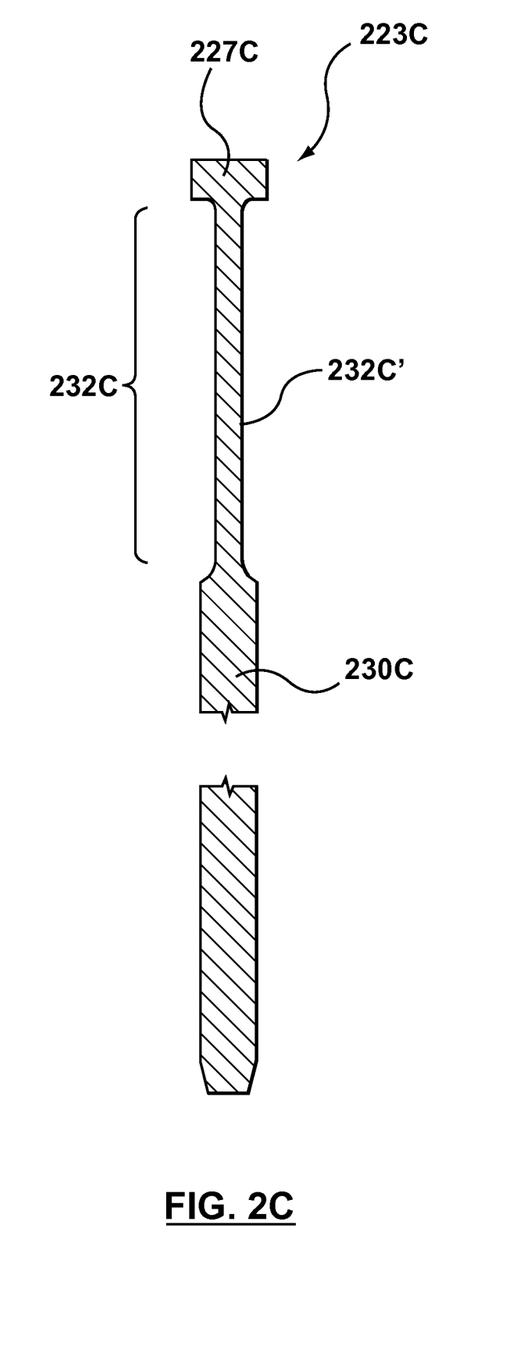

While in the embodiments described above a reduction in diameter in the region of increased flexibility is stated as being in the range of between 20% to 40%, it will be appreciated that reductions in diameter either below or above this range may also be implemented to achieve a desired degree of flexibility in valve pins in accordance with embodiments hereof. As well a length of the region may be in the range of between 20-25 mm but a region having a shorter length may provide sufficient flexing if the reduction in diameter is maximized. In other embodiments, a length greater than 25 mm may be preferred so that the diameter in the region of increased flexibility need not be reduced as much. It will further be appreciated that the region of increased flexibility 232A may be achieved by way of a range of profiles, and that scalloped profile 232A' is merely exemplary. Two further examples are represented by regions 232B, 232C shown in FIGS. 2B and 2C, respectively, in which the reduction in diameter of pin shaft 230B, 230C has either a stepped profile 232B' or a radiused profile 232C', respectively.

Figure 2D:
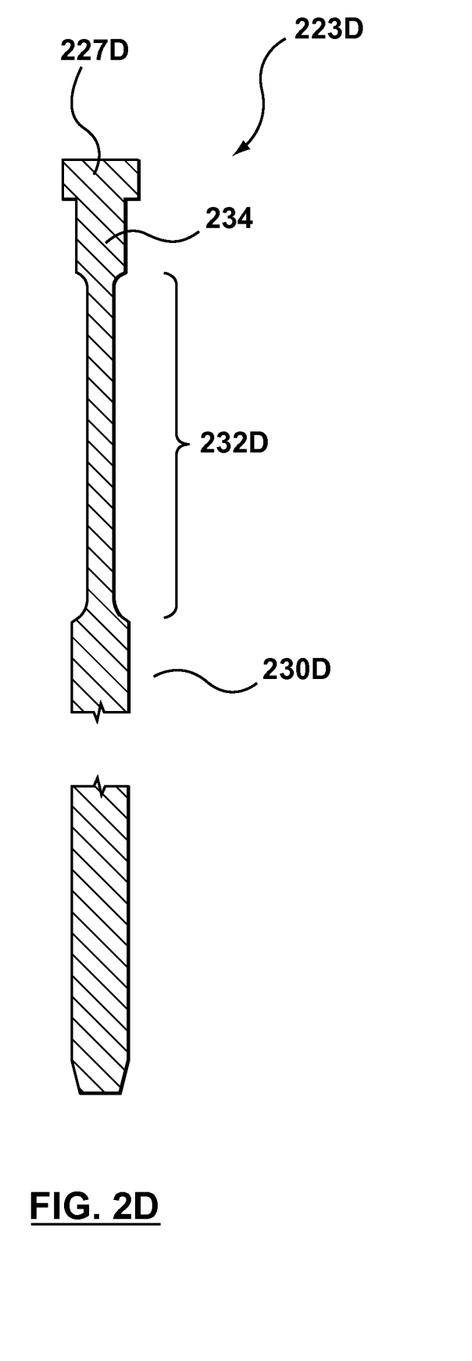

The regions of increased flexibility 232A, 232B, 232C are each shown to be positioned immediately forward of head 227A, 227B, 227C, respectively, to be disposed rearward of a hot runner manifold within a bore of a cooled mold plate, such as rearward of manifold 110 and valve pin bushing 128 of apparatus 100 within back plate 119. In another embodiment shown in FIG. 2D, valve pin 223D has a pin shaft 230D that includes an intermediate region 234 having a diameter sized in between that of a reduced diameter region of increased flexibility 232D and head 227D.

Although each of valve pins 223A-223D are shown to have heads 227A, 227B, 227C, 227D on an upstream end thereof, it would be understood by one of ordinary skill in the art that valve pins according to embodiments hereof may not include an enlarged head portion without departing from the scope of the present invention.

Figure 3:
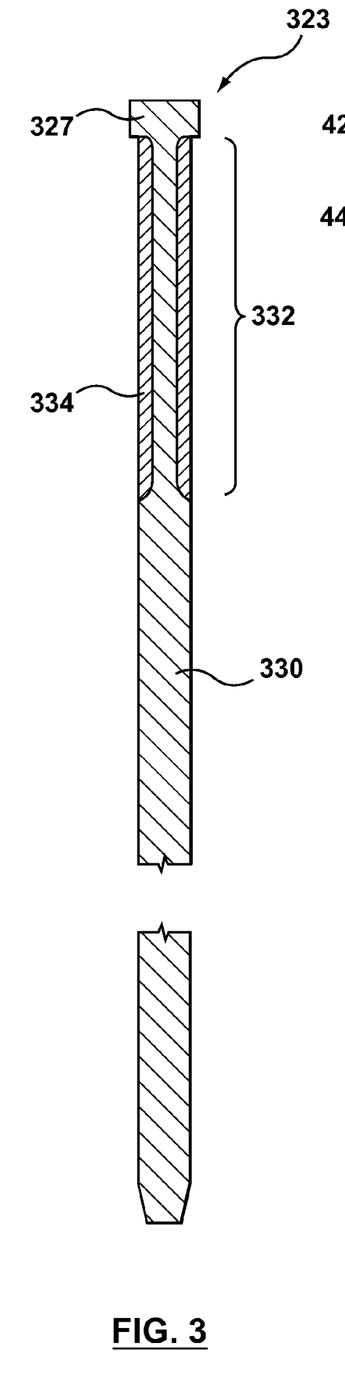
FIG. 3 is a sectional view of another embodiment of a flexible valve pin wherein the segment of reduced diameter is fitted with a secondary material.

FIG. 3 presents a further embodiment of a valve pin 323 wherein the region of increased flexibility 332 between head 327 and a remainder of pin shaft 330 includes a reduced diameter area of pin shaft 330 that is fitted with or surrounded by a secondary flexible material 334, so as to maintain the same overall diameter as the remainder of pin shaft 330. Exemplary materials suitable for this purpose may include spring steel or other spring metal alloys, a fiber or laminated composite material, or a thermal resistive plastic such as Polyimide or Polyether ether ketone (PEEK). Region of increased flexibility 332 is shown to be a rearward segment of valve pin shaft 330 positioned immediately forward of head 327 such that when installed within an injection molding system, region 332 is disposed rearward of a hot runner manifold within a bore of a cooled mold plate, such as rearward of manifold 110 and valve pin bushing 128 of apparatus 100 within back plate 119.

Figure 4:
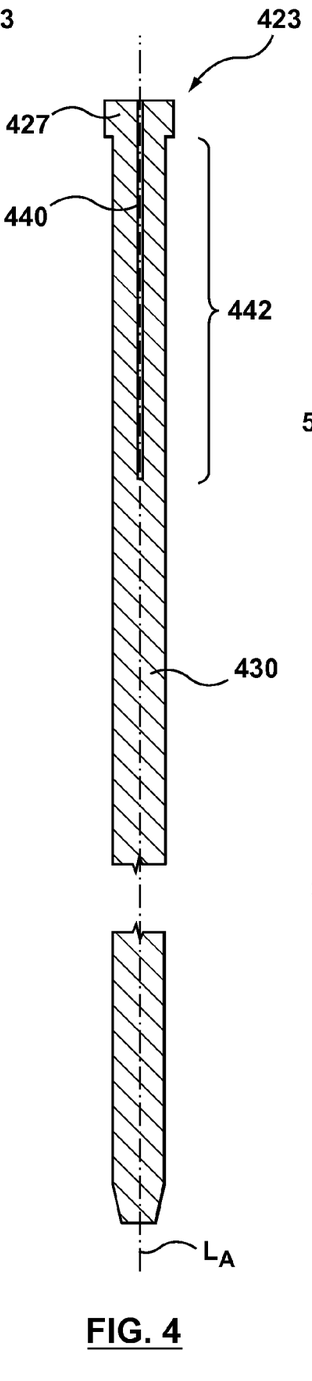
FIG. 4 is a sectional view of another embodiment of a flexible valve pin wherein a portion of the internal structure is removed to promote flexibility.

Turning now to FIG. 4, shown is a flexible valve pin 423 in which greater flexibility is achieved by reducing the amount or volume of material through a portion of the internal or center region of the valve pin 423. As shown, valve pin 423 is configured with a borehole 440 generally concentric with a longitudinal axis $L_4$ of valve pin 423. The borehole 440 passes through head 427 and along a length of a region of increased flexibility 442 immediately forward of head 427. The sizing of borehole 440 may be in the range of between 20 to 40% of the diameter of pin shaft 430 of valve pin 423, but as will be appreciated, borehole dimensions above and below this range may also be implemented to achieve a desired degree of flexibility. In an embodiment utilizing a standard valve pin having a pin shaft diameter of 5 mm, the diameter of the borehole may be 1 mm. With this arrangement, under conditions of considerable side loading, valve pin 423 is able to flex in the region of increased flexibility 442 due to the decrease in volume thereof, thereby accommodating any lateral displacement forces. Region of increased flexibility 442 is shown to be a rearward segment of valve pin shaft 430 positioned immediately forward of head 427 such that when installed within an injection molding system, region 442 is disposed rearward of a hot runner manifold within a bore of a cooled mold plate, such as rearward of manifold 110 and valve pin bushing 128 of apparatus 100 within back plate 119.

Figure 5:
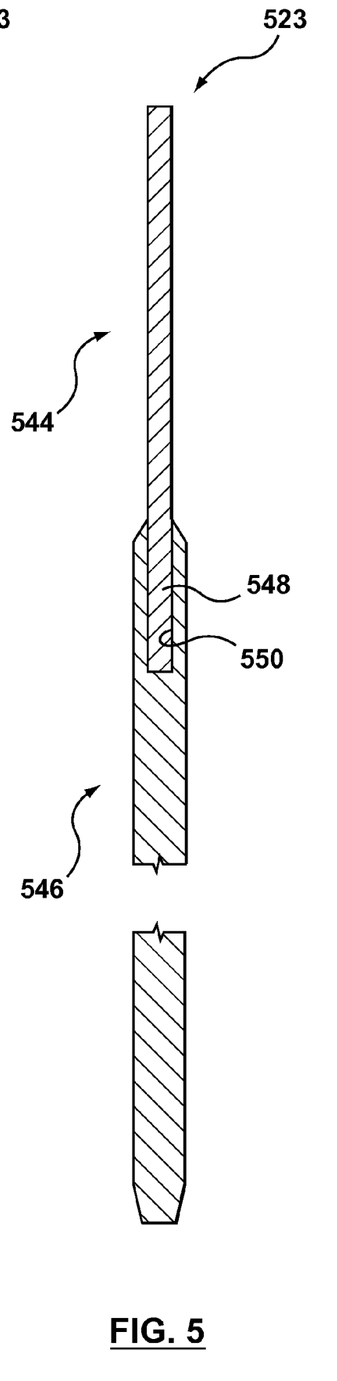
FIG. 5 is a sectional view of another embodiment of a flexible valve pin wherein the flexible valve pin includes multiple components.

Presented in FIG. 5 is an embodiment wherein a valve pin 523 is of a two-part construction, wherein an upstream portion of valve pin 523 is a region of increased flexibility 544 that is formed of a material having a greater degree of flexibility compared to a downstream shaft portion 546 which defines the remainder of valve pin 523. Upstream region 544 may have the same diameter as downstream shaft portion 546, or it may comprise a decreased or reduced diameter, depending on the injection molding application and degree of flexibility required. In the embodiment shown, the flexible upstream region 544 is of reduced diameter compared to downstream shaft portion 546 and does not include an enlarged head at its rearward end. Non-limiting examples of suitable materials for the upstream region 544 include spring steel or other spring metal alloys. While FIG. 5 presents upstream region 544 as having an extension 548 that is received in a corresponding recess 550 provided in downstream shaft portion 546, a variety of interconnections may be used to achieve a secure fit between these components. Upstream region 544 and downstream shaft portion 546 are generally fixedly attached, for example through metallurgic bonding (e.g. brazing technology) or by way of interference fit. It will be appreciated, however, that alternate methods of fixedly attaching the upstream and downstream portions may be implemented. It will be further appreciated that attachment methodologies that permit detachment may also be used, such as threaded engagement between these components. Similar to the previously described embodiments, region of increased flexibility 544 is shown to be an upstream or rearward segment of valve pin 523 such that when installed within an injection molding system, region 544 is to be disposed rearward of a hot runner manifold within a bore of a cooled mold plate, such as rearward of manifold 110 and valve pin bushing 128 of apparatus 100 within back plate 119.

Figure 6A:
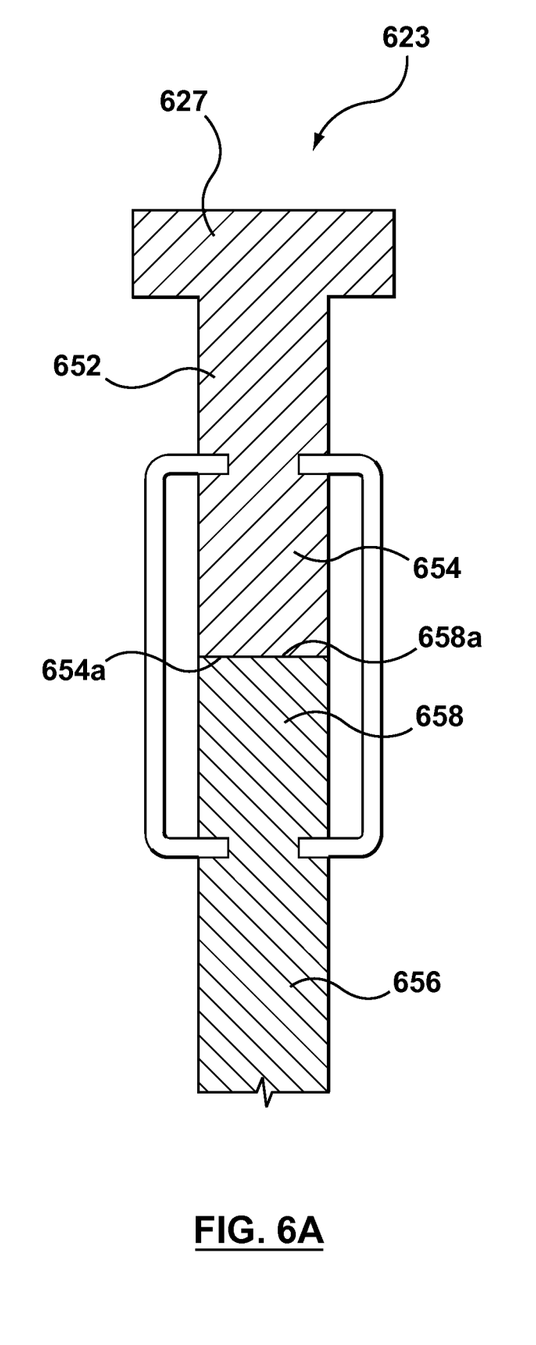
FIGS. 6A and 6B are sectional views of an embodiment of a two-part valve pin.
Figure 6B:
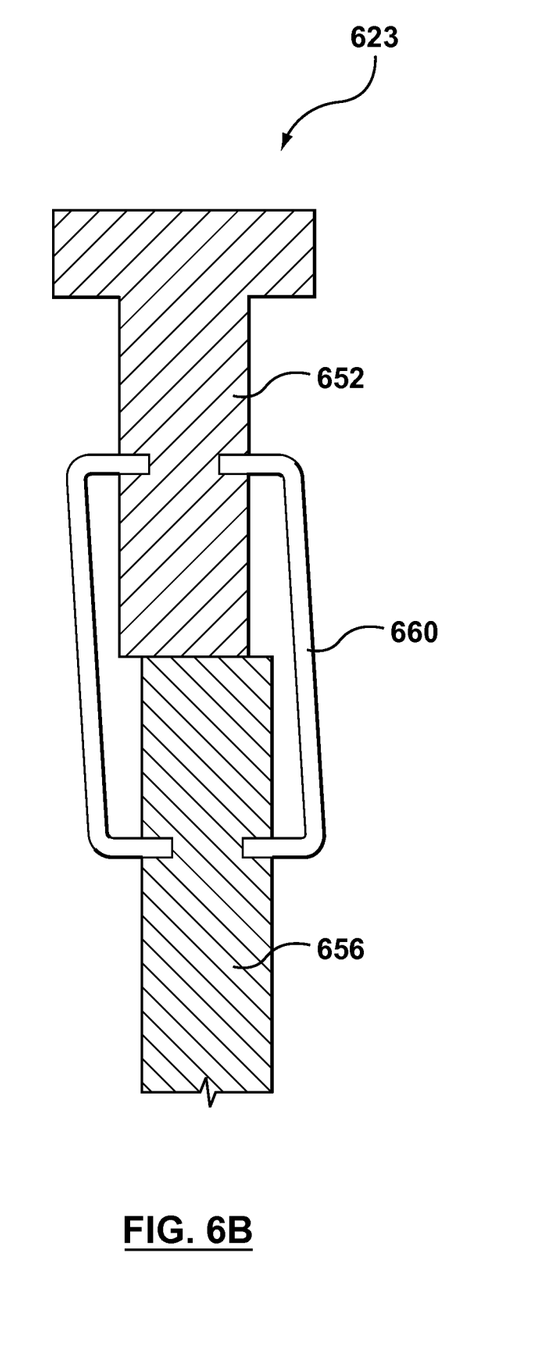

While a region of increased flexibility in the valve pin is one way to accommodate lateral displacement forces due to side loading, in other embodiments hereof non-flexing methodologies are employed. Shown in FIG. 6A is an embodiment wherein a valve pin 623 is of multi-piece construction having laterally displaceable forward and rearward sections. As shown, valve pin 623 is provided with a rearward section 652 having head 627 and an upstream shaft 654. Valve pin 623 is also provided with a forward section 656 having a downstream shaft 658, and tapered forward end (not shown). Shaft sections 654, 658 are configured with a slidable interface formed by corresponding faces 654a, 658a, respectively, along which lateral displacement due to side loading is accommodated. During forward movement of valve pin 623, corresponding slidable faces 654a, 658a transmit forwardly directed forces from a valve pin actuation mechanism (not shown), such as during the closure of a mold gate. In order to transmit rearwardly directed forces, again from the valve pin actuation mechanism, one or more links 660 are provided. As shown, each end of link 660 is securely fastened to respective upstream and downstream shafts 654, 658, allowing for rearward movement, such as during the opening of the mold gate. Lateral displacement due to side loading of forward section 656 relative to rearward section 652 along corresponding faces 654a, 658a is represented in FIG. 6B. Similar to the previously described embodiments, the slidable interface formed by corresponding faces 654a, 658a along which lateral displacement of upstream and downstream shafts 654, 658 occurs is situated along a length of valve pin 623 such that when installed within an injection molding system, the slidable interface is disposed rearward of a hot runner manifold within a bore of a cooled mold plate, such as rearward of manifold 110 and valve pin bushing 128 of apparatus 100 within back plate 119.

Figure 7A:
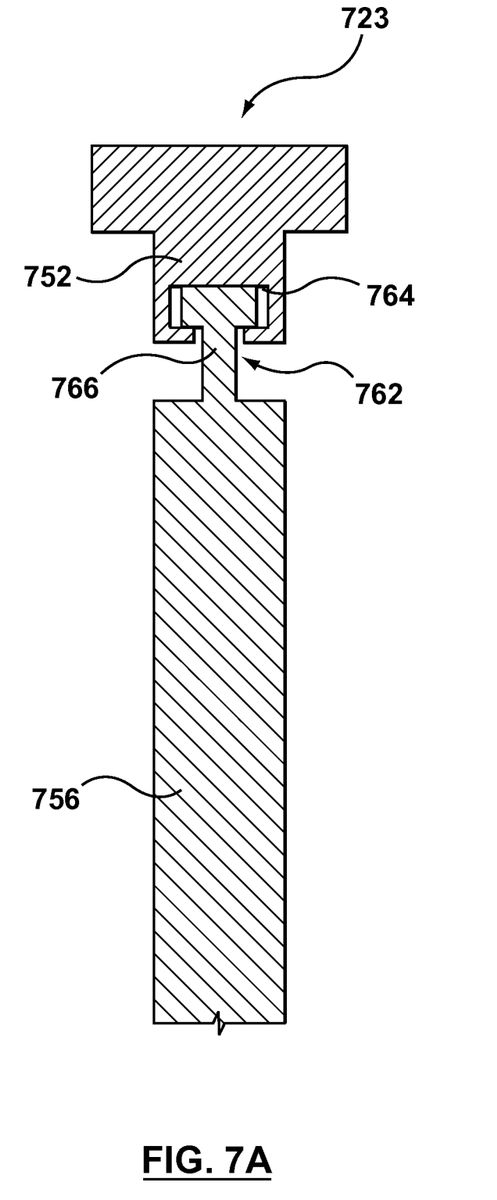
FIGS. 7A and 7B are sectional views of another embodiment of a two-part valve pin.
Figure 7B:
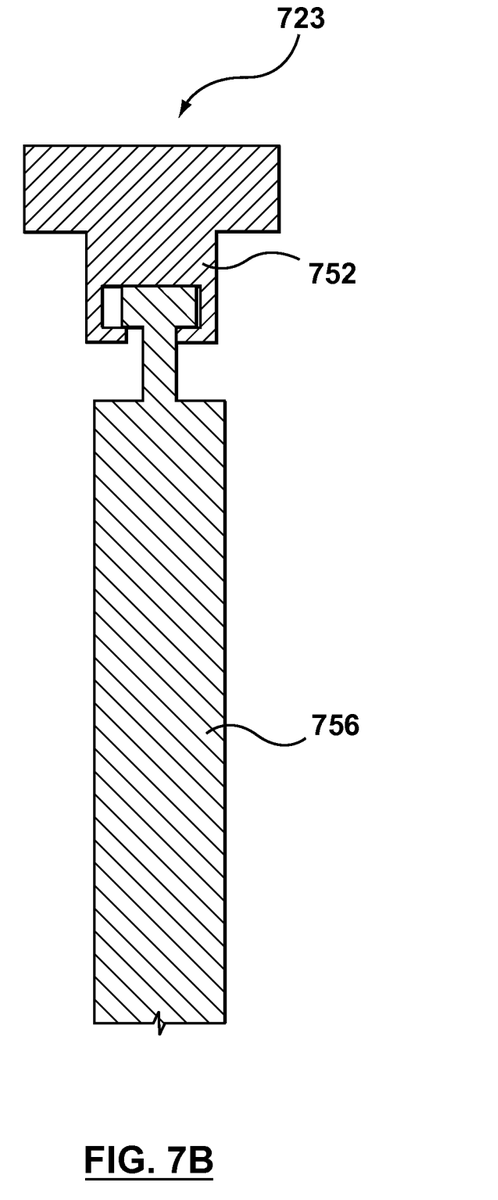

FIG. 7A presents a further embodiment of a valve pin 723 also having a rearward section 752 and forward section 756, wherein lateral displacement due to side loading is accommodated by virtue of a T-slot or similar arrangement situated at a slidable interface between sections 752, 756. As shown, forward section 756 of valve pin 723 is provided with a T-shaped extension 762 having a stem 766, while rearward section 752 of valve pin 723 is provided with a cooperating slot 764. A clearance is provided within slot 764 and in the region surrounding stem 766 to permit for side-to-side movement of forward section 756 relative to rearward section 752. In order to accommodate lateral displacements in any direction, the clearances provided in the region of stem 766 and within slot 764 may be configured radially, that is 360° around the central or longitudinal axis of valve pin 723. While keyed T-shaped extension 762 and corresponding slot 764 are shown as being provided on forward section 756 and rearward section 752, respectively, it will be appreciated that in certain situations, the reversed arrangement of these features may also be implemented. Lateral displacement due to side loading of rearward section 752 relative to forward section 756 is represented in FIG. 7B. Similar to the previously described embodiments, the slidable interface formed between extension 762 and slot 764 along which lateral displacement of rearward and forward sections 752, 756 occurs is situated along a length of valve pin 723 such that when installed within an injection molding system, the slidable interface is disposed rearward of a hot runner manifold within a bore of a cooled mold plate, such as rearward of manifold 110 and valve pin bushing 128 of apparatus 100 within back plate 119.

Figure 8A:
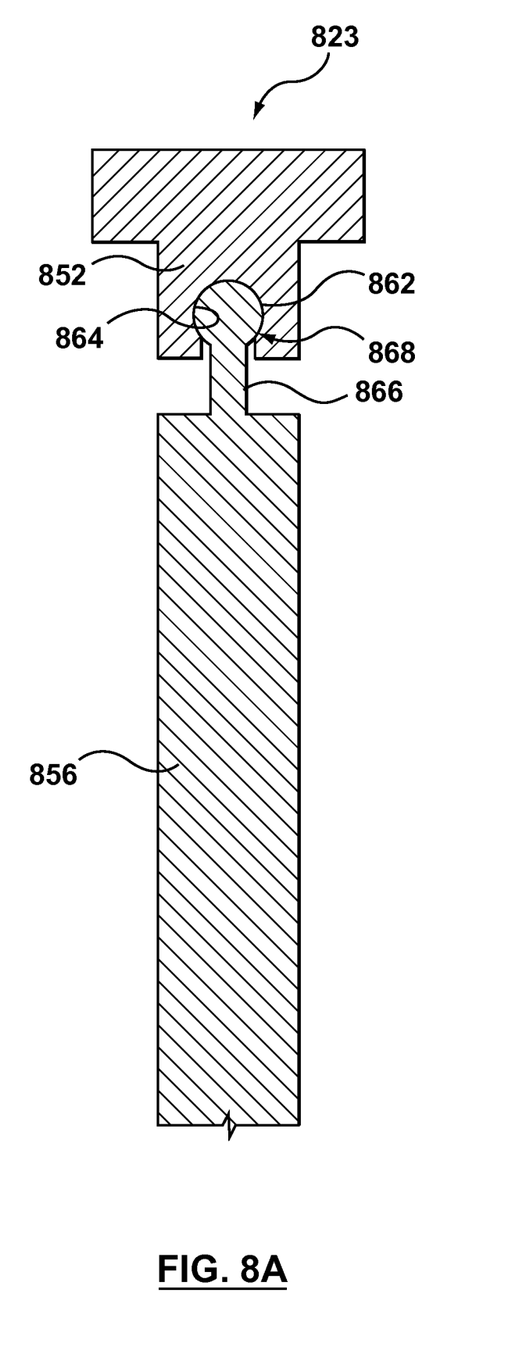
FIGS. 8A and 8B are sectional views of another embodiment of a two-part valve pin.
Figure 8B:
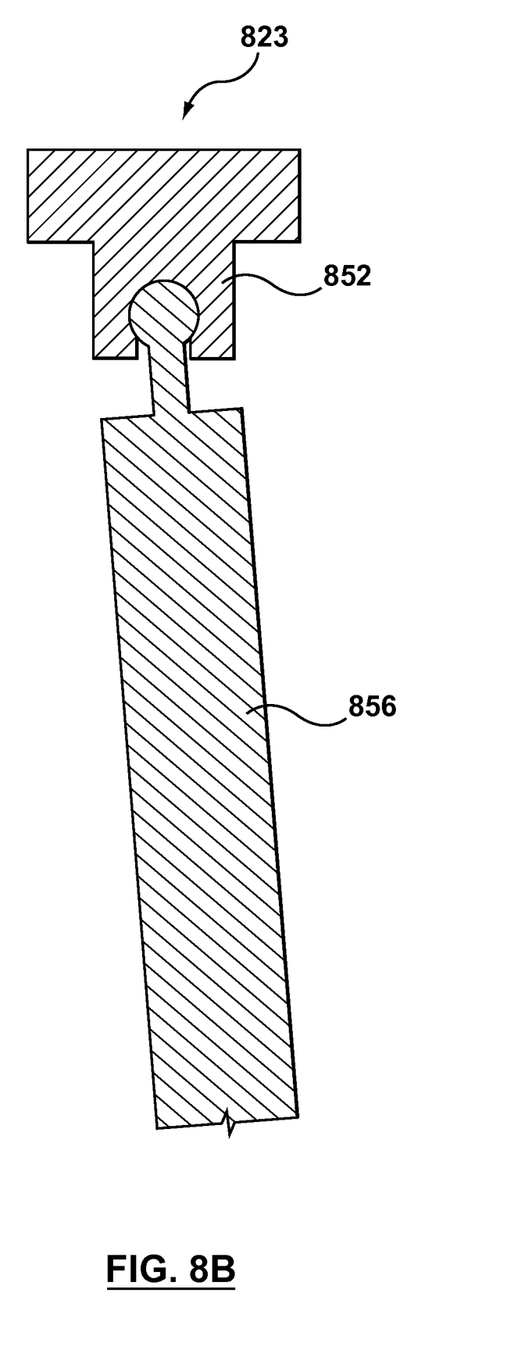

FIG. 8A presents another embodiment of a valve pin 823 in which a rearward section 852 and a forward section 856 are interconnected by way of a ball-joint 868, permitting angular displacement between the rearward and forward sections 852, 856 on experiencing side loading. As shown, forward section 856 of valve pin 823 is provided with a ball-shaped extension 862 having a stem 866, while rearward section 852 of valve pin 823 is provided with a corresponding bearing surface 864. A clearance is provided in the region surrounding stem 866 to permit angular displacement of forward section 856 relative to rearward section 852. Angular displacement due to side loading of forward section 856 relative to rearward section 852 is represented in FIG. 8B. In another embodiment, the valve pin does not include rearward section 852 but instead is coupled to a piston or other actuatable structure via a ball-joint 868. Similar to the previously described embodiments, ball-joint 868 about which angular displacement of rearward and forward sections 852, 856 occurs is situated along a length of valve pin 823 such that when installed within an injection molding system, the rotatable interface is disposed rearward of a hot runner manifold within a bore of a cooled mold plate, such as rearward of manifold 110 and valve pin bushing 128 of apparatus 100 within back plate 119.

Figure 9A:
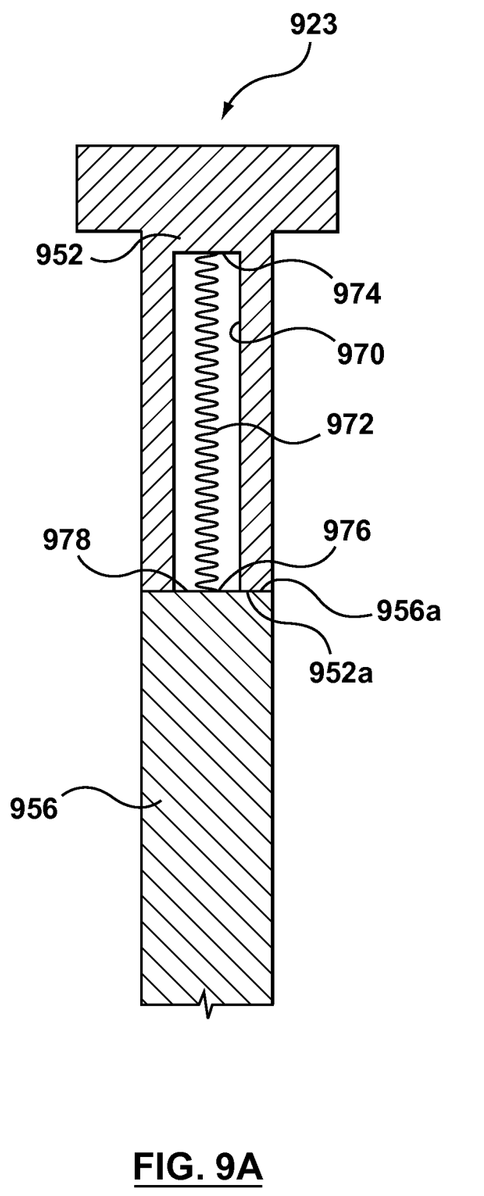
FIGS. 9A and 9B are sectional views of another alternate embodiment of a two-part valve pin.
Figure 9B:
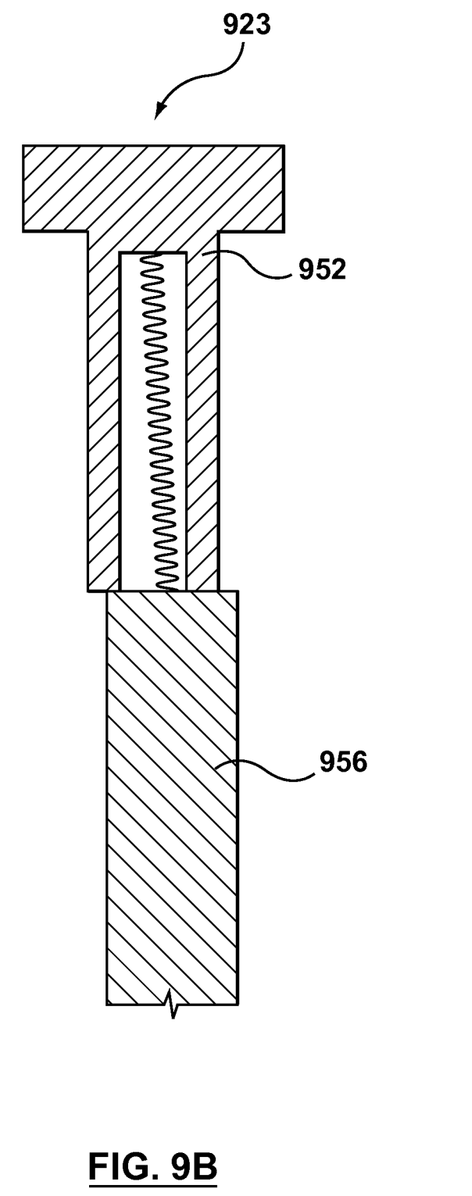

FIG. 9A illustrates another embodiment of a valve pin 923 in which a rearward section 952 and a forward section 956 are interconnected by way of a biasing member 972 located within valve pin 923. As shown, rearward section 952 is provided with a recess 970 in which biasing member 972 is situated. Biasing member 972 has a first end 974 that is fixedly attached within recess 970 to rearward section 952, and a second end 976 that is fixedly attached to an end face 978 of forward section 956. Rearward and forward sections 952, 956 are configured with a slidable interface formed by corresponding contact surfaces 952a, 956a, respectively, along which lateral displacement due to side loading is accommodated. With this arrangement, biasing member 972 provides an inwardly directed biasing force to urge engagement between corresponding contact surfaces 952a, 956a of rearward section 952 and forward section 956, respectively, while permitting lateral displacement along the slidable interface there between when under side loading. Biasing member 972 may take on a variety of forms including, but not limited to a spring or tensioned wire. Lateral displacement of forward section 956 relative to rearward section 952 due to side loading is represented in FIG. 9B. While the above embodiment places recess 970 within rearward section 952, the valve pin may be alternatively constructed to provide the recess in forward section 956, or partially in both rearward and forward sections 952/956, respectively. Similar to the previously described embodiments, the slidable interface formed by corresponding faces 952a, 956a along which lateral displacement of rearward and forward sections 952, 956 occurs is situated along a length of valve pin 923 such that when installed within an injection molding system, the slidable interface is disposed rearward of a hot runner manifold within a bore of a cooled mold plate, such as rearward of manifold 110 and valve pin bushing 128 of apparatus 100 within back plate 119.

Figure 10:
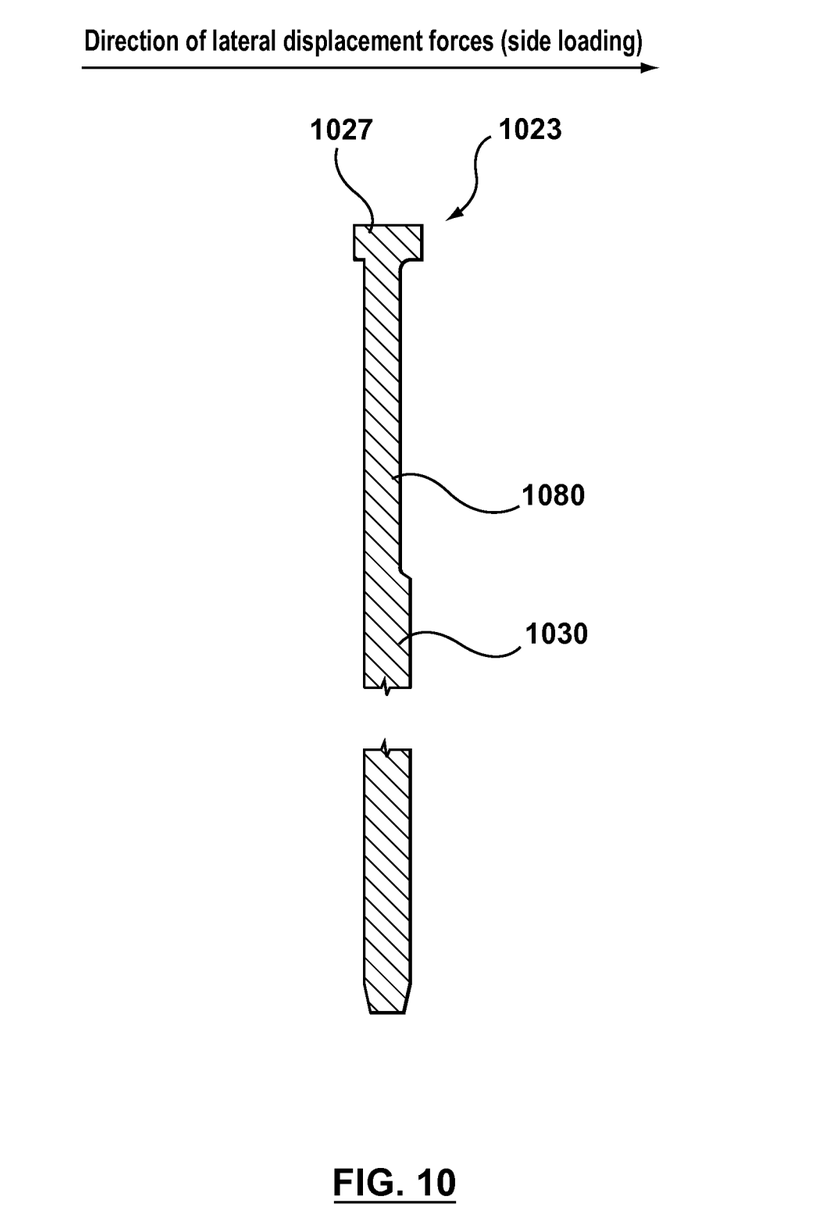
FIG. 10 is a sectional view of an alternate embodiment of a flexible valve pin.

The regions of increased flexibility that are formed by decreasing the diameter of a valve pin, as described above with reference to FIGS. 2A-2D and FIGS. 3-5, generally have the reduction in diameter provided around the full circumference of the valve pin. In this way, regardless of the rotational position of the valve pin, the valve pin will exhibit a certain degree of flex. It will be appreciated, however, that in instances where the valve pins are restricted from being able to rotate within the injection molding apparatus, material removal from along a single side of the valve pin in the form of one or more scallops or strips, for example, may provide sufficient flex to permit accommodation of side loading and lateral displacement forces. In the embodiment of FIG. 10, a flexible valve pin 1023 having a region of increased flexibility 1080 formed by a recess provided within one side of pin shaft 1030 immediately downstream of head 1027 is shown. In general, region 1080 is located so as to enable flexing of valve pin 1023 in the same direction as the force associated with side loading. While in FIG. 10 region 1080 is positioned on a face of valve pin 1023 on an opposite side of or away from the incoming lateral displacement force, recess 1080 may alternatively be positioned on another face of valve pin 1023 to achieve a desired degree of flex in the valve pin.

Figure 11:
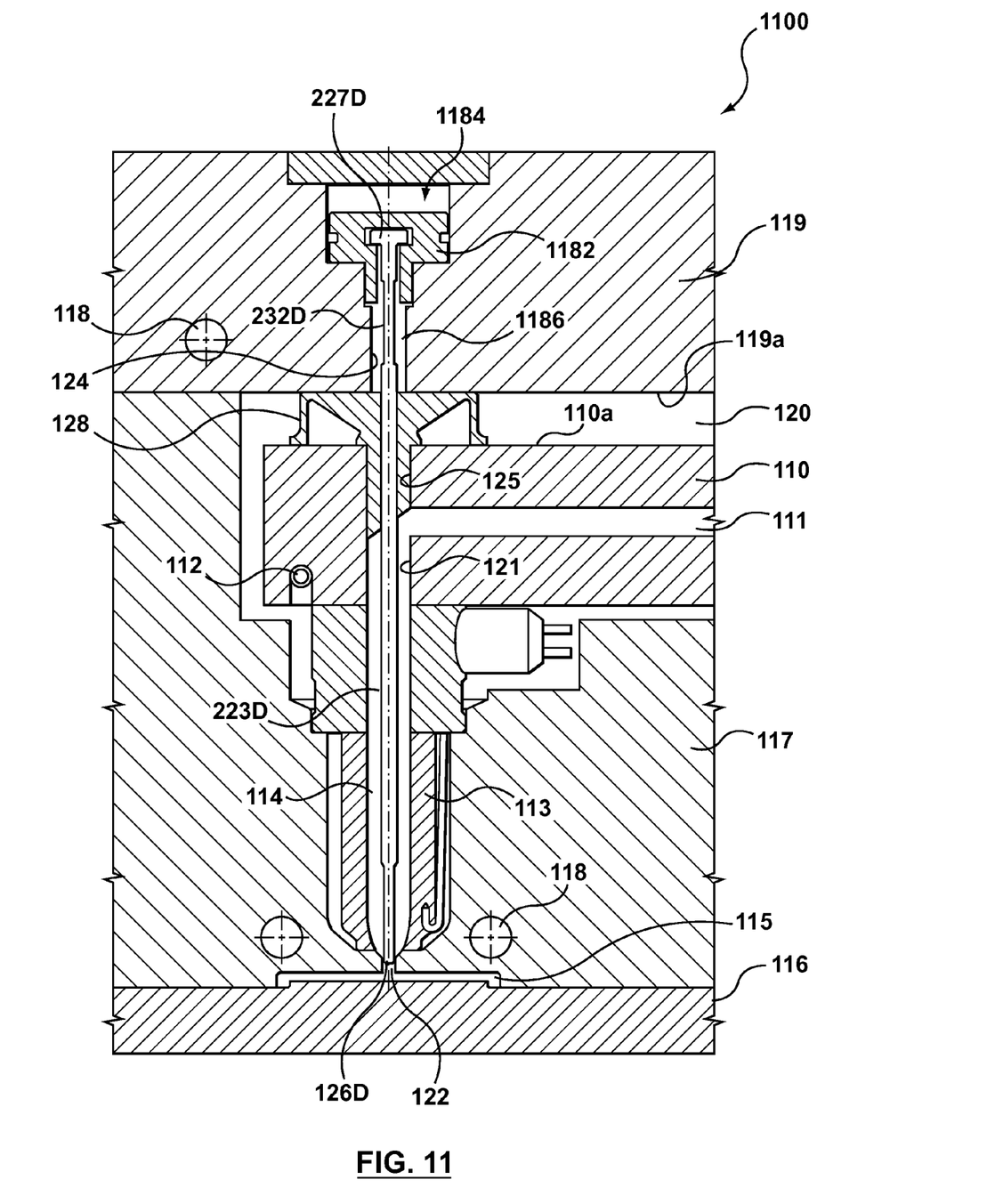
FIG. 11 is a sectional view of a portion of an injection molding system having a flexible valve pin arrangement operably coupled to an actuator in accordance with an embodiment hereof.
Figure 12:
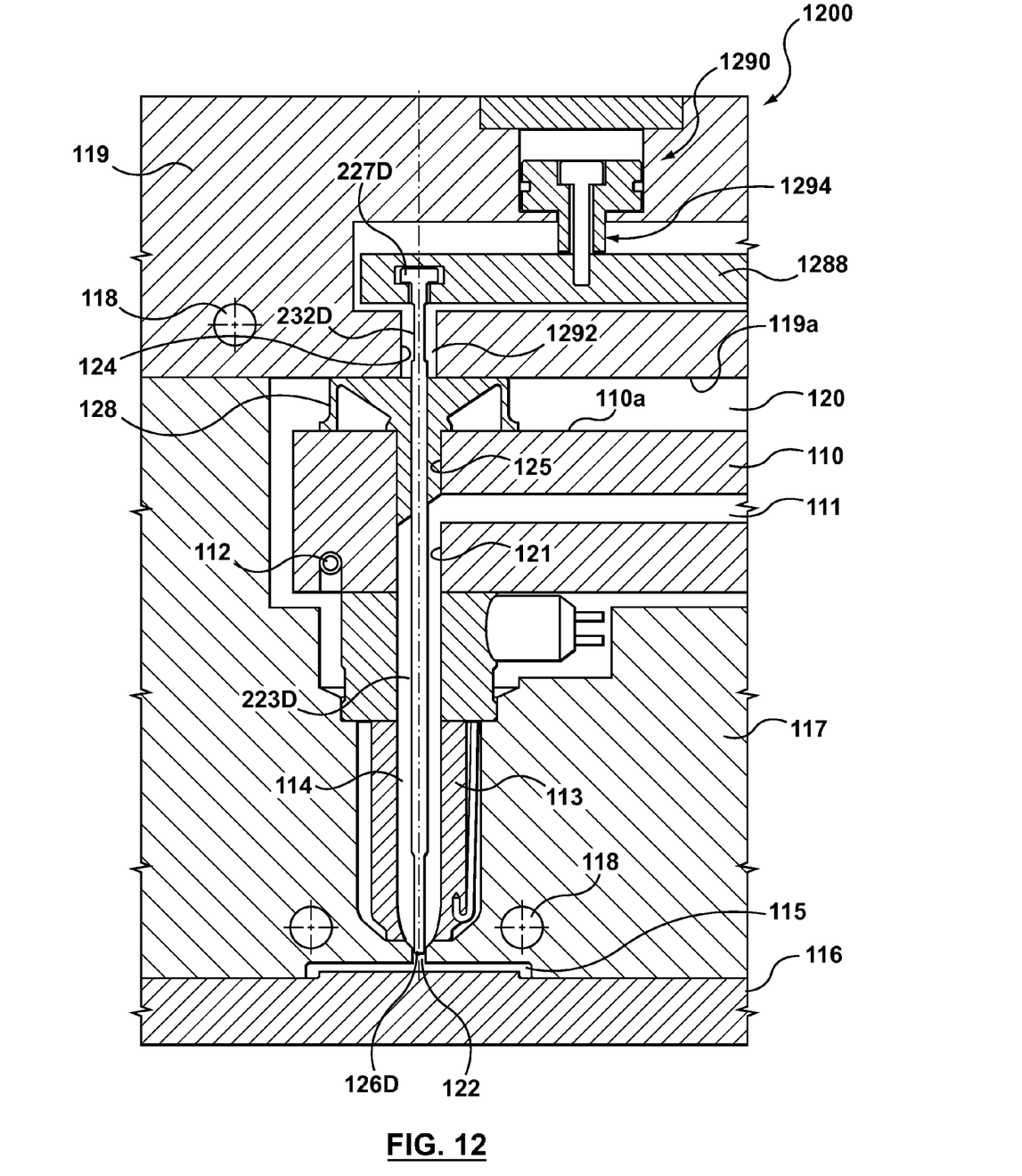
FIG. 12 is a sectional view of a portion of an injection molding system having a flexible valve pin arrangement operably coupled to an actuator plate in accordance with another embodiment hereof.

The valve pins described here can be used in cooperation with a range of actuator systems. FIGS. 11 and 12 depict portions of the prior art system shown in FIG. 1 adapted for use with embodiments of the present invention and as such common portions of the injection molding systems shown in each of these figures include reference numbers previously described with reference to FIG. 1 that are not further described below. FIG. 11 depicts an injection molding apparatus 1100 incorporating a flexible valve pin 223D (as detailed in FIG. 2D) wherein valve pin 223D is operably coupled to an actuator piston 1182 of a valve pin actuator 1184. In general, valve pin actuator 1184 translates valve pin 223D between an open and closed position by linear motion, e.g., a pneumatic piston, or rotary motion, e.g., an electric screw drive. Any style of valve pin actuator is suitable, provided that it can translate valve pin 223D between an open and closed position. In the arrangement shown, the region of increased flexibility 232D provided by the reduced diameter of valve pin 223D is disposed within bore 124 of back plate 119, thereby forming a clearance 1186 there between. Head 227D of valve pin 223D is suitably dimensioned and interfaced with actuator piston 1182 as would be familiar to one skilled in the art. In FIG. 11, actuator piston 1182 is stroked fully forward such that a downstream end 126D of valve pin 223D is in the closed position seated within mold gate 122.

In another embodiment shown in FIG. 12, an injection molding apparatus 1200 includes one or more flexible valve pins 223D (as detailed in FIG. 2D) that are operably coupled to an actuator plate 1288, which in turn is operably coupled to one or more actuators 1290. Actuators 1290 translate actuator plate 1288 between an open and closed position by linear motion, e.g., a pneumatic piston, or rotary motion, e.g., an electric screw drive. To accomplish such movement, each actuator 1290 has a stationary part, e.g., a housing or cylinder, connected to back plate 119 and also has a movable part 1294, e.g., a piston or part extending from the piston, connected to actuator plate 1288. The number of actuators is a design choice, and in other embodiments more or fewer actuators can be used. Any style of actuator is suitable, provided that it can translate the actuator plate 1288 and valve pins 223D between open and closed positions. In FIG. 12, actuator plate 1288 is positioned such that a downstream end 126D of valve pin 223D is in the closed position seated within mold gate 122. Once again, the region of increased flexibility 232D provided by the reduced diameter of valve pin 223D is disposed within bore 124 of back plate 119, thereby forming a clearance 1292 there between. As is generally known in the art, an actuator plate 1288 reciprocates in response to the actuators 1290, so as to control a plurality of valve pins. As such, it will be appreciated that the arrangement shown in FIG. 12 is merely exemplary of a single nozzle arrangement, and that a plurality of such arrangements are likely to be present in an injection molding apparatus comprising an actuation plate mechanism.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. An injection molding system comprising:
   a hot runner manifold having a melt channel for receiving a melt stream of moldable material from a melt source;
   a hot runner nozzle having a melt channel for receiving the melt stream from the manifold melt channel and delivering the melt stream to a mold cavity via a mold gate; and
   a valve pin having a shaft that extends from an actuation mechanism through at least a portion of the manifold melt channel and the nozzle melt channel such that a forward end of the valve pin is seatable within the mold gate, the valve pin shaft having a rearward segment disposed between the manifold melt channel and the actuation mechanism that is configured to accommodate shifting between the manifold and the actuation mechanism that occurs under operating conditions.

2. The injection molding system of claim 1, wherein the rearward segment of the valve pin shaft includes a flexible region having a reduced diameter with respect to a forward segment of the valve pin shaft.

3. The injection molding system of claim 2, wherein the reduced diameter of the flexible region has one of a scalloped profile, a stepped profile, and a radiused profile.

4. The injection molding system of claim 2, wherein the diameter is reduced around the circumference of the valve pin.

5. The injection molding system of claim 2, wherein the flexible region is surrounded by a second material that is more flexible than a first material of the valve pin.

6. The injection molding system of claim 1, wherein the rearward segment of the valve pin shaft includes a flexible region having a reduced volume with respect to a forward segment of the valve pin shaft, wherein the reduced volume is provided by a borehole that extends along a longitudinal axis of the valve pin for a length of the flexible region.

7. The injection molding system of claim 1, wherein the rearward segment of the valve pin shaft is formed of a material that is more flexible than a material of a forward segment of the valve pin shaft.

8. The injection molding system of claim 1, wherein the valve pin includes a rearward section and a forward section with one of a slidable and rotatable interface there between being disposed within the rearward segment of the valve pin shaft.

9. The injection molding system of claim 8, wherein the valve pin includes the slidable interface, the slidable interface being formed between corresponding opposed faces of the rearward and forward sections of the valve pin such that lateral displacement of the rearward section relative to the forward section occurs along the slidable interface to accommodate shifting between the manifold and the actuation mechanism under operating conditions.

10. The injection molding system of claim 9, further comprising one or more links for securing the rearward and forward sections of the valve pin together.

11. The injection molding system of claim 9, further comprising a biasing member for biasing the rearward and forward sections of the valve pin together.

12. The injection molding system of claim 8, wherein the valve pin includes the rotatable interface, the rotatable interface being provided by a ball-joint between the rearward and forward sections of the valve pin such that angular displacement of the forward section relative to the rearward section occurs along the rotatable interface to accommodate shifting between the manifold and the actuation mechanism under operating conditions.

13. The injection molding system of claim 8, wherein the valve pin includes the slidable interface, the slidable interface being formed between a slot within the rearward section and an extension of the forward section.

14. The injection molding system of claim 1, wherein the actuating mechanism includes one of an actuator piston and an actuator plate to which a rearward end of the valve pin is operably coupled.

15. The injection molding system of claim 1, wherein the manifold is positioned forward of a back plate and the actuation mechanism is coupled to the back plate such that the rearward segment of the valve pin extends within the back plate.

* * * * *